(No Model.)
M. F. BISHOP.
DEVICE FOR HEATING WATER OVER ALCOHOL LAMPS.
No. 514,436. Patented Feb. 13, 1894.
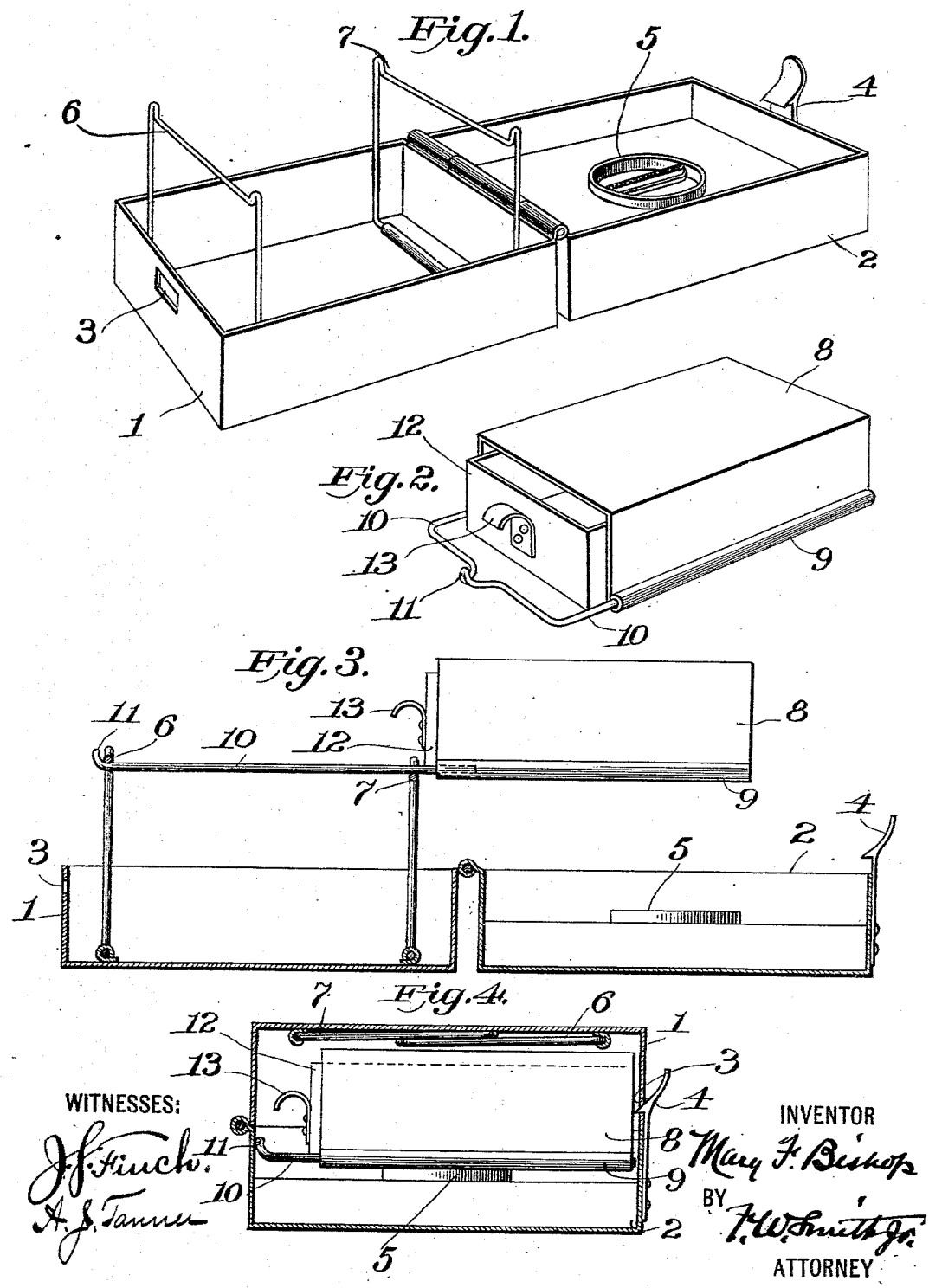
WITNESSES:
J. F. Finch
A. J. Tanner
INVENTOR
Mary F. Bishop
BY
F. W. Smith Jr.
ATTORNEY

UNITED STATES PATENT OFFICE.

MARY F. BISHOP, OF BRIDGEPORT, CONNECTICUT.

DEVICE FOR HEATING WATER OVER ALCOHOL-LAMPS.

SPECIFICATION forming part of Letters Patent No. 514,436, dated February 13, 1894.

Application filed May 22, 1893. Serial No. 475,057. (No model.)

*To all whom it may concern:*

Be it known that I, MARY F. BISHOP, a citizen of the United States, residing at Bridgeport, in the county of Fairfield and State of Connecticut, have invented certain new and useful Improvements in Devices for Heating Hot Water over Alcohol-Lamps, &c.; and I do hereby declare the following to be a full, clear, and exact description of the invention, such as will enable others skilled in the art to which it appertains to make and use the same.

My invention relates to attachments to alcohol-lamps and the like for heating hot water for toilet purposes, and will be best understood from the following description, reference being had to the accompanying drawings, in which—

Figure 1, is a perspective of a folding alcohol lamp such as is commonly used for toilet purposes, and with which my invention is especially identified. Fig. 2, is a detail perspective of my hot water heating attachment; Fig. 3, a sectional elevation showing my attachment in position over the lamp shown at Fig. 1, and Fig. 4, is a sectional elevation showing my improvement packed away in the box of the folded lamp.

Similar numbers of reference denote like parts in the several figures of the drawings.

The lamp which I have shown comprises two box like receptacles 1, 2, hinged together, and provided respectively with nick 3 and engaging spring catch 4 whereby such sections may be secured together in folded position. Within the section 2 is the alcohol-lamp 5, while hinged to the bottom of the section 1 are folding supports 6, 7, on which may rest any device, such as curling-irons, in position for being heated over the flame of the lamp. These parts and constructions which I have described are old and well known and form no part of my invention, although they are especially adapted to the use of my invention.

8 is a box or casing made of metal and open at the forward end.

9 are hollow beads formed at the lower lateral edges of said box, within which beads extend the ends of a wire frame 10 the outer or closed portion whereof terminates in an upwardly extending lip 11. This frame has a free movement in and out of said beads for the purpose presently explained.

12 is a metallic drawer fitted within the casing 8 and having a handle 13 made of some material that is a poor conductor of heat.

In applying my invention for use, the frame is pulled out, as shown at Fig. 3, and rested upon the supports 6, 7, with the lip 11 extending beneath the support 6.

By the use of my invention water may be speedily heated without smutting the receptacle containing the water, and when not in use the frame 10 may be pushed within the beads 9 and the device readily packed away in the box 1. If desired, the hot water drawer may be entirely removed and the casing utilized for the purpose of heating curling-irons, or for other purposes. Also, my improvement as shown at Fig. 2, may be utilized independent of any lamp, since the frame 10 may be pulled out to its limit and utilized as a handle whereby the casing 8 may be held over a gas jet or other flame.

I claim—

1. The combination of the hinged receptacles 1, 2, provided respectively with folding supports 6, 7, and lamp 5, the metallic casing 8 open at one end and having hollow beads at its lower lateral edges, the metallic hot water drawer within said casing, and the frame within said beads and capable of extension, substantially as set forth.

2. The combination of the casing open at one end and the hot water drawer contained therein, with the extensible frame connected to said casing, substantially as set forth.

In testimony whereof I affix my signature in presence of two witnesses.

MARY F. BISHOP.

Witnesses:
RICHD. A. STORRS,
CORNELIA STORRS.